(12) United States Patent
Stopler (10) Patent No.: US 7,346,012 B2
(45) Date of Patent: Mar. 18, 2008

(54) TRANSCEIVER WITH ACCELERATED ECHO CANCELLER CONVERGENCE

(75) Inventor: Danny Stopler, Holon (IL)

(73) Assignees: Tioga Technologies Ltd., Tel Aviv (IL); STMicroelectronics Ltd., Netanya (IL)

( * ) Notice: Subject to any disclaimer, the term of this patent is extended or adjusted under 35 U.S.C. 154(b) by 986 days.

(21) Appl. No.: 10/318,423

(22) Filed: Dec. 13, 2002

(65) Prior Publication Data
US 2004/0114542 A1  Jun. 17, 2004

(51) Int. Cl.
H04B 3/20    (2006.01)

(52) U.S. Cl. .................................. 370/286; 379/406.05

(58) Field of Classification Search ..................... None
See application file for complete search history.

(56) References Cited

U.S. PATENT DOCUMENTS

| | | | | |
|---|---|---|---|---|
| 5,132,963 | A | * | 7/1992 | Ungerboeck ................. 370/286 |
| 5,353,305 | A | * | 10/1994 | Fukuda et al. ............... 375/231 |
| 5,812,537 | A | * | 9/1998 | Betts et al. .................. 370/286 |
| 6,223,194 | B1 | * | 4/2001 | Koike .......................... 708/322 |
| 6,240,128 | B1 | * | 5/2001 | Banerjea et al. ............. 375/222 |
| 6,327,302 | B1 | * | 12/2001 | Shen ........................... 375/232 |
| 6,687,235 | B1 | * | 2/2004 | Chu ............................. 370/286 |
| 2003/0118094 | A1 | * | 6/2003 | Wang et al. ................. 375/231 |

FOREIGN PATENT DOCUMENTS

| DE | 100 52 718 A1 | 5/2002 |
|---|---|---|
| EP | 1 187 360 A2 | 3/2002 |
| JP | 60-16032 | 1/1985 |
| WO | WO 98/38582 | 9/1998 |

OTHER PUBLICATIONS

Gitlin, R. et al., *Data Communications Principles*, Plenum Press, New York, 1992, pp. 488-499, 528-535, 607-661.
Haykin, S., *Adaptive Filter Theory*, Third Edition, Prentice Hall, New Jersey, 1996, pp. 365-372.
Vaidyanathan, P., *Multirate Systems and Filter Banks*, Prentice Hall, New Jersey, 1993, pp. 100-133.

* cited by examiner

*Primary Examiner*—Ramnandan Singh
(74) *Attorney, Agent, or Firm*—Lisa K. Jorgenson; Ronald Stern; Seed IP Law Group PLLC (57) ABSTRACT

A receiver for receiving an incoming signal over a communication medium includes an echo canceller, which is adapted to receive an outgoing signal transmitted over the communication medium, and to process the outgoing signal using a set of variable processing coefficients in order to generate an echo cancellation signal. A summer combines the incoming signal with the echo cancellation signal so as to generate an echo-cancelled signal. An equalizer applies an equalization operation to the echo-cancelled signal so as to generate an equalized signal. A residual echo cancellation circuit processes the equalized signal so as to adaptively update the variable processing coefficients of the echo canceller.

43 Claims, 4 Drawing Sheets

TRANSCEIVER WITH ACCELERATED ECHO CANCELLER CONVERGENCE

FIELD OF THE INVENTION

The present invention relates generally to transceivers for duplex communication, and specifically to echo cancellation in such transceivers.

BACKGROUND OF THE INVENTION

Echo cancellation is commonly used in duplex communication systems in which transceivers simultaneously transmit and receive signals over the same frequency band or on mutually-adjacent bands. Echo cancellation is used to eliminate the echo of the near-end signal transmitted by the transceiver from the far-end signal that it receives. Typically, the echo of the near-end signal is very strong by comparison with the far-end signal. In Digital Subscriber Line (DSL) systems, for example, the far-end signal received by a modem may be attenuated by the channel by as much as 40-50 dB. Therefore, DSL modems and other high-speed data receivers may be required to suppress echo power by as much as 70-80 dB in order to achieve an acceptable signal-to-echo interference ratio at the receiver.

In general, the echo conditions to which a given modem is subject vary over time, due to temperature and voltage changes, for example. The echo canceller used in the modem should be able to adapt to such variations. As the level of integration and modem density in communication systems increase, the rate of change of echo conditions tends to increase, as well, due to adjacent modems being activated, deactivated or changing their operational mode. Therefore, it is important that the echo canceller be able to adapt quickly and accurately to changes in the echo conditions.

In a typical modem, the echo canceller (EC) comprises a transversal filter with tap spacing equal to the symbol interval. The EC processes an input from the transmitter, using the transversal filter, to generate an estimate of the echo signal, which is subtracted from the received signal. The resulting echo-canceled signal is then equalized and decoded to recover the data from the received signal. The echo-canceled signal itself is used as an error signal to adjust the tap coefficients of the EC transversal filter, typically by means of the well-known stochastic least-mean-square (LMS) algorithm. The LMS algorithm is described, for example, by Haykin, in Chapter 9 of Adaptive Filter Theory (3rd edition, Prentice Hall, 1996), which is incorporated herein by reference.

The error-canceled signal, however, typically contains high-level noise power, due mainly to the far-end signal itself, which is uncorrelated noise as far as the echo canceller is concerned, as well as to thermal noise and crosstalk. This high-level noise induces a slow adaptation rate, i.e., a long adaptation time constant $\tau$. Specifically, the adaptation of the tap coefficients of the echo canceller transversal filter can be expressed as:

$$C_k^{(n+1)} = C_k^{(n)} + \mu \cdot e(n) \cdot x(n-k) \tag{1}$$

Here $C_k^{(n)}$ is tap coefficient k at time n, $\mu$ is the adaptation step size, $e(n)$ is the error signal, and $x(n)$ is the tap input. Given $\sigma_x$ as the root-mean-square (RMS) variance of the input signal to the echo canceller, and $N_{EC}$ as the length of the echo canceller transversal filter (in symbols), the adaptation time constant is given approximately by:

$$\tau \approx \frac{1}{\mu \cdot \sigma_X^2} = \frac{10^{SNR/10} \cdot N_{EC}}{2} \tag{2}$$

In this equation, SNR is the adaptation signal/noise ratio (in dB), i.e., $10^{-SNR/10}$ $$10^{-SNR/10} \equiv \frac{\sigma_{AD}^2}{\sigma_{FAR}^2}.$$

$\sigma_{AD}$ is the RMS variance of the adaptation noise in the echo-canceled signal, and $\sigma_{FAR}$ is the RMS variance of the far-end signal (along with additive noise sources, such as crosstalk) in the echo-canceled signal.

It will be observed that $\tau$ increases with the required SNR and with $N_{EC}$. For example, if the adaptation noise is required to be 50 dB weaker than the far-end signal (SNR=50 dB), and the echo canceller spans 200 symbols, then $\tau$ is $10^7$ symbols long. The adaptation time becomes longer still if a polyphase echo canceller structure is used.

A number of solutions to the problem of long echo canceller adaptation time have been proposed. For example, Banerjea et al. describe a modem with enhanced echo canceller convergence in U.S. Pat. No. 6,240,128, whose disclosure is incorporated herein by reference. The modem includes two echo cancellers: a "conventional" echo canceller, which processes the transmitted signal and generates an echo cancellation signal for subtraction from the received signal before equalization; and a post-equalization echo canceller, which uses the equalized signal as an input to cancel residual echo signals that may result from drift in the echo characteristics during operation. The conventional echo canceller is "trained" during initial half-duplex operation of the modem, and its coefficients are then fixed, while the post-equalization echo canceller is allowed to continue adapting.

SUMMARY OF THE INVENTION

It is an object of some aspects of the present invention to provide improved methods and devices for echo cancellation, and particularly to accelerate the rate of adaptation of an echo canceller.

In preferred embodiments of the present invention, a receiver comprises an echo canceller with a residual echo cancellation circuit for controlling the adaptation of the echo canceller tap coefficients. The echo canceller processes transmitted signals in order to generate an echo cancellation signal for subtraction from the received signal, before equalization. The residual echo cancellation circuit processes the equalized signal in order to estimate the residual echo in the signal, and then modifies the tap coefficients of the echo canceller accordingly.

In other words, rather than adding an additional stage of echo cancellation after equalization, as proposed by Banerjea, the echo canceller of the present invention casts the post-equalization residual echo back to the pre-equalization echo cancellation stage. Therefore, implementation of the present invention requires only a single echo canceller in the receiver signal path, rather than two successive echo cancellers as in Banerjea's receiver. By measuring changes in the echo signal in the low-noise post-equalization environment, the residual echo cancellation circuit of the present invention is able to detect and correct for these changes much more rapidly than is possible with pre-equalization echo signal measurement alone. At the same time, because the correction is cast back to the pre-equalization echo canceller, the echo level in the echo-canceled input to the equalizer is also reduced, thus improving the performance of the equalizer, too, and reducing its adaptation time.

There is therefore provided, in accordance with a preferred embodiment of the present invention, a receiver for receiving an incoming signal over a communication medium, the receiver including:

an echo canceller, which is adapted to receive an outgoing signal transmitted over the communication medium, and to process the outgoing signal using a set of variable processing coefficients in order to generate an echo cancellation signal;

a summer, which is coupled to combine the incoming signal with the echo cancellation signal so as to generate an echo-cancelled signal;

an equalizer, which is adapted to apply an equalization operation to the echo-cancelled signal so as to generate an equalized signal; and a residual echo cancellation circuit, which is coupled to receive and process the equalized signal so as to adaptively update the variable processing coefficients of the echo canceller.

Preferably, the residual echo cancellation circuit is adapted to estimate a residual echo component in the equalized signal, and to update the variable processing coefficients so as to cancel the residual echo component. Typically, the receiver includes a decision unit, which is coupled to receive the equalized signal and to determine output data values responsive thereto, wherein the residual echo cancellation circuit includes a subtractor, which is coupled to take a difference between the equalized signal and the output data values in order to determine the residual echo component. Preferably, the residual echo cancellation circuit is coupled to receive the outgoing signal, and to process the outgoing signal together with the residual echo component in order to update the variable processing coefficients. Most preferably, the residual echo cancellation circuit includes a digital filter having multiple taps, having respective tap coefficients associated therewith, and the digital filter is coupled to apply the digital filter to the outgoing signal while adjusting the tap coefficients responsive to the residual echo component, and the variable processing coefficients of the echo canceller are updated responsive to the adjusted tap coefficients of the digital filter.

Preferably, the echo canceller includes a first digital filter having first taps, and the variable processing coefficients include first tap coefficients, which are respectively associated with the first taps, and the echo canceller is coupled to apply the first digital filter to the outgoing signal in order to generate the echo cancellation signal. The residual echo cancellation circuit includes a second digital filter having second taps, having respective second tap coefficients associated therewith, and the residual echo cancellation circuit is coupled to apply the second digital filter to the outgoing signal so as to generate a filter output, while adjusting the second tap coefficients responsive to the filter output, and to update the first tap coefficients responsive to the adjusted second tap coefficients.

In a preferred embodiment, the second digital filter includes multiple phases, including respective subsets of the second taps, and the residual echo cancellation circuit is adapted to determine the second tap coefficients for all of the multiple phases, for use in updating the first tap coefficients.

In another preferred embodiment, the residual echo cancellation circuit includes a variable delay element, which is coupled to convey the outgoing signal to the second digital filter at a plurality of different time lags, and the residual echo cancellation circuit is adapted to determine the second tap coefficients for each of the different time lags, for use in updating the first tap coefficients.

In a further embodiment, the residual echo cancellation circuit is adapted to apply a maximum likelihood estimator to the adjusted second tap coefficients in order to determine updated values of the first tap coefficients. In an alternative embodiment, the residual echo cancellation circuit is adapted to apply a maximum a posteriori (MAP) filter to the adjusted second tap coefficients in order to determine updated values of the first tap coefficients.

In still another preferred embodiment, the residual echo cancellation circuit is adapted to find a gradient of the adjusted second tap coefficients in order to determine an increment to be applied to update the first tap coefficients. Preferably, the residual echo cancellation circuit is adapted to update the first tap coefficients while applying a leakage to at least one of the first and second tap coefficients.

Typically the equalizer includes a time-domain equalizer, preferably a feed-forward equalizer (FFE). In a preferred embodiment, the FFE is adapted to operate on the echo-cancelled signal at an equalization rate that is a non-integer fraction of a symbol rate of the incoming signal, and the residual echo cancellation circuit includes a digital filter having multiple phases, and is coupled to process the outgoing signal using the multiple phases in order to update the variable processing coefficients. Preferably, the receiver includes a slicer, which is coupled to receive the equalized signal and to determine output data values responsive thereto, wherein the residual echo cancellation circuit includes a subtractor, which is coupled to take a difference between the equalized signal and the output data values in order to determine an error signal for use in updating the variable processing coefficients.

In an alternative embodiment, the equalizer includes a frequency-domain equalizer. In this case, the incoming and outgoing signals may be multi-tone signals.

In a preferred embodiment, the incoming signal is received by the receiver at a first rate, and the outgoing signal is transmitted at a second rate, which is different from the first rate.

There is also provided, in accordance with a preferred embodiment of the present invention, a method for processing an incoming signal received over a communication medium, the method including:

processing an outgoing signal, which is to be transmitted over the communication medium, using a set of variable processing coefficients in order to generate an echo cancellation signal;

combining the incoming signal with the echo cancellation signal so as to generate an echo-cancelled signal;

applying an equalization operation to the echo-cancelled signal so as to generate an equalized signal; and processing the equalized signal so as to adaptively update the variable processing coefficients used in generating the echo cancellation signal.

The present invention will be more fully understood from the following detailed description of the preferred embodiments thereof, taken together with the drawings in which:

DETAILED DESCRIPTION OF PREFERRED EMBODIMENTS

Figure 1:
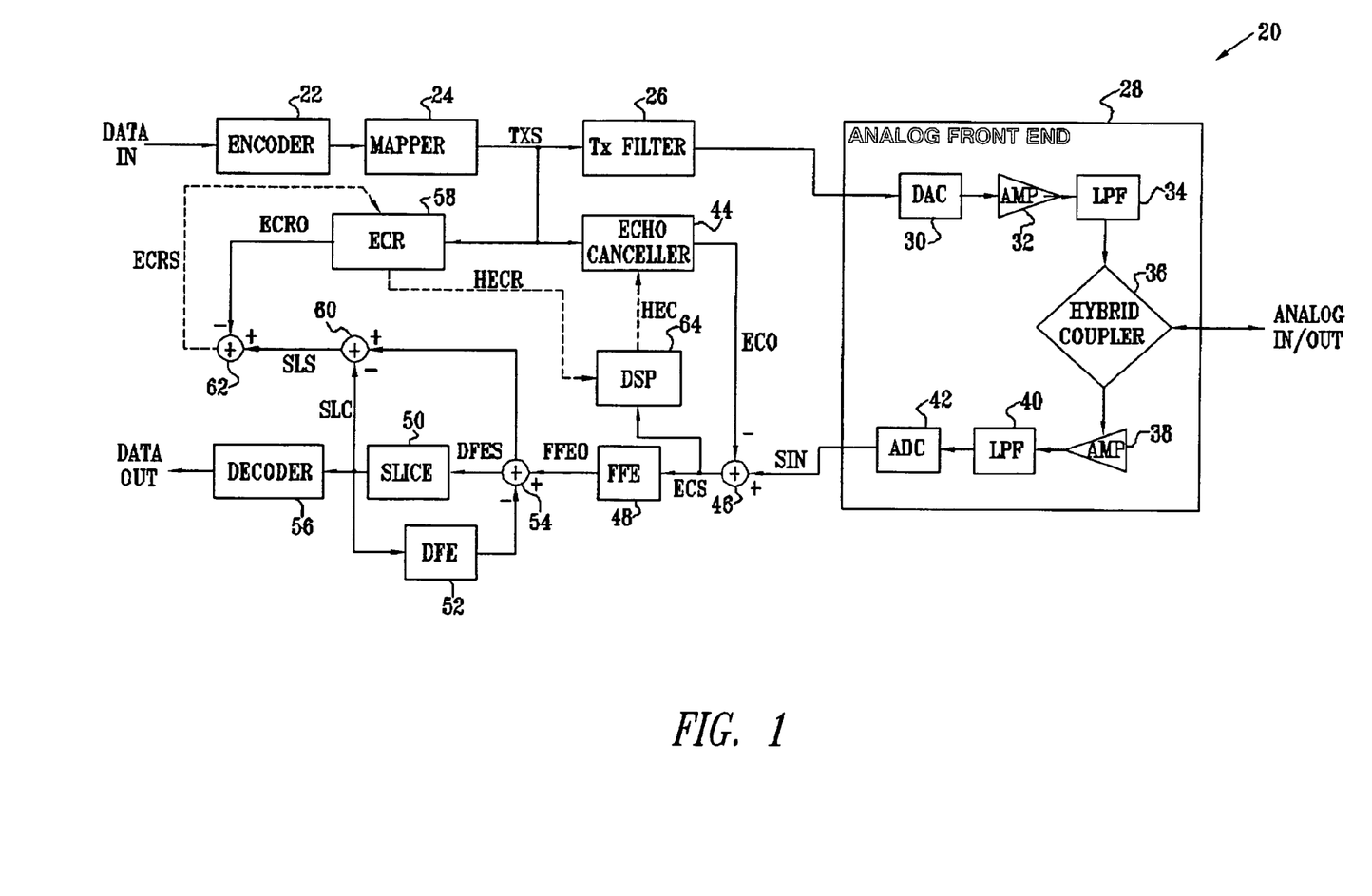
FIG. 1 is a block diagram that schematically illustrates a data transceiver, in accordance with a preferred embodiment of the present invention.

FIG. 1 is a block diagram that schematically illustrates a data transceiver 20, in accordance with a preferred embodiment of the present invention. The design of transceiver 20 is particularly appropriate for use in DSL modems, as well as in voice-grade data modems, for communication over telephone lines. It will be recognized, however, that the principles embodied in this transceiver may similarly be applied to modems and transceivers of other types, for use in both wired and wireless communications. Typically, the functional blocks of transceiver 20 that are shown in FIG. 1 and described hereinbelow are incorporated together in a single integrated circuit chip or chip set. Alternatively, some or all of these blocks may be implemented using discrete components or (in the case of the digital processing blocks) in software on a suitable programmable processor.

In the transmit path of transceiver 20, an encoder 22 encodes the bits of an input data stream, and a mapper 24 maps these bits to symbols, as is known in the art. The transmitted symbol stream is labeled TXS in the figure. (In the detailed analysis of transceiver 20 given below, it is assumed, for the sake of example, that the transceiver uses a pulse amplitude modulation (PAM) symbol constellation. Extension of the methods and circuits of the present invention to other modulation schemes, including complex schemes such as quadrature amplitude modulation (QAM), is straightforward.) The transmitted symbols TXS are filtered by a digital transmit filter 26, and are then input to an analog front end 28, as is known in the art.

In front end 28, a digital/analog converter (DAC) 30 converts the symbol stream to an analog signal, which is amplified and filtered by an amplifier 32 and analog low-pass filter (LPF) 34. A hybrid coupling circuit 36 couples the outgoing signals into a communication channel for transmission to a remote receiver. Some of the transmitted signal energy, however, is reflected back into the receive path of transceiver 20, resulting in an echo in the received signals. Although hybrid circuit 36 is typically designed to attenuate this echo, the attenuation is imperfect (generally only 15-30 dB) due to problems of impedance mismatch.

On the receive path, incoming signals are coupled by hybrid coupler 36 into an amplifier 38, followed by an input LPF 40. The signals are then sampled and digitized by an analog/digital converter (ADC) 42 to generate a stream of digital input samples, labeled SIN. An echo canceller 44 processes the transmitted symbols TXS to generate an echo cancellation signal, labeled ECO, which should be a replica of the echo signal from front end 28. Typically, the echo canceller comprises an adaptive transversal (time domain) filter, fed by TXS, based on the assumption that the echo is linear in the transmitted power. The length of the transversal filter preferably exceeds the time span of the actual echo in the received signals. A summer 46 subtracts ECO from SIN to produce an echo-canceled signal, labeled ECS.

The next part of the receive path of transceiver 20 is an equalization stage, comprising a feed-forward equalizer (FFE) 48 and a slicer 50, with a decision feedback equalizer (DFE) 52. The FFE and DFE typically comprise multi-tap digital filters, whose tap coefficients are determined adaptively, as is known in the art. FFE 48 may operate at a rate that is a non-integer fraction of the symbol rate, as is known in the art, for example, 3/2 the symbol rate (so that the FFE operates on interpolated samples spaced in time by 2/3 of the actual symbol spacing). A forward-equalized sample stream output by FFE 48, labeled FFEO, is combined in a summer 54 with a decision feedback signal generated by DFE 52, to generate a final, equalized sample stream DFES. Slicer 50 quantizes DFES to produce decision values of the symbols, labeled SLC. These values are then decoded by a decoder 56 to generate the output data stream from transceiver 20.

The tap coefficients of echo canceller 44 are determined using a residual error canceling circuit (ECR) 58. This circuit comprises a transversal filter, similar to that in echo canceller 44. ECR 58 receives the transmitted symbol stream TXS as its input, and generates a residual-corrected output, labeled ECRO. The error signal input to ECR 58, labeled ECRS, is derived from the equalized sample stream of the receiver, DFES, following FFE 48 and summer 54. A summer 60 subtracts the decision values SLC from the equalized samples DFES to generate a residual error signal, labeled SLS. The residual-corrected output ECRO of ECR 58 is subtracted from the residual error signal SLS by a further summer 62 to generate the error signal input ECRS. The tap coefficients of ECR 58 adapt, typically using LMS adaptation, so that ECRO cancels the residual error signal SLS. To ensure full estimation of the residual echo, the transversal filter in ECR 58 is preferably substantially longer than that in echo canceller 44, so as to cover the complete time span of any possible residual echo in DFES.

A digital signal processor (DSP) 64 reads the tap coefficients of ECR 58 (which can be represented as a vector $h_{ECR}$—shown in the figure as HECR). The DSP uses these coefficients to calculate the correction that is required in the tap coefficients of echo canceller 44 ($h_{EC}$, or HEC). In principle, assuming perfect convergence of ECR 58, applying these corrected tap coefficients in the echo canceller will exactly cancel the residual echo at ECS. Because of the low noise in the error signal ECRS, ECR 58 is able to adapt to changes in echo conditions with a substantially lower time constant than echo canceller 44 could adapt by itself. DSP 64 thus updates the coefficients of echo canceller 44 at a relatively high rate, obviating the requirement for any further adaptation by echo canceller 44 itself while transceiver 20 is in normal operation. Alternatively, adaptation by echo canceller 44 may continue in parallel with the operation of ECR 58. In the description that follows, the combined operation of ECR 58 and DSP 64 in updating the coefficients of echo canceller 44 is referred to as "convergence acceleration."

The equalization stage of transceiver 20 that is shown in FIG. 1 has the general form of a time-domain equalizer. Alternatively, the echo cancellation circuits of the present invention may be adapted to work with frequency-domain equalization, as is used in modems based on discrete multi-tone (DMT) signal modulation, for example. In this case, the error signal input to ECR 58 may be in either the frequency domain or converted back to the time domain. In either case, following adaptation of ECR 58, DSP 64 still determines and applies the tap coefficients of echo canceller 44 in the time-domain.

Figure 2:
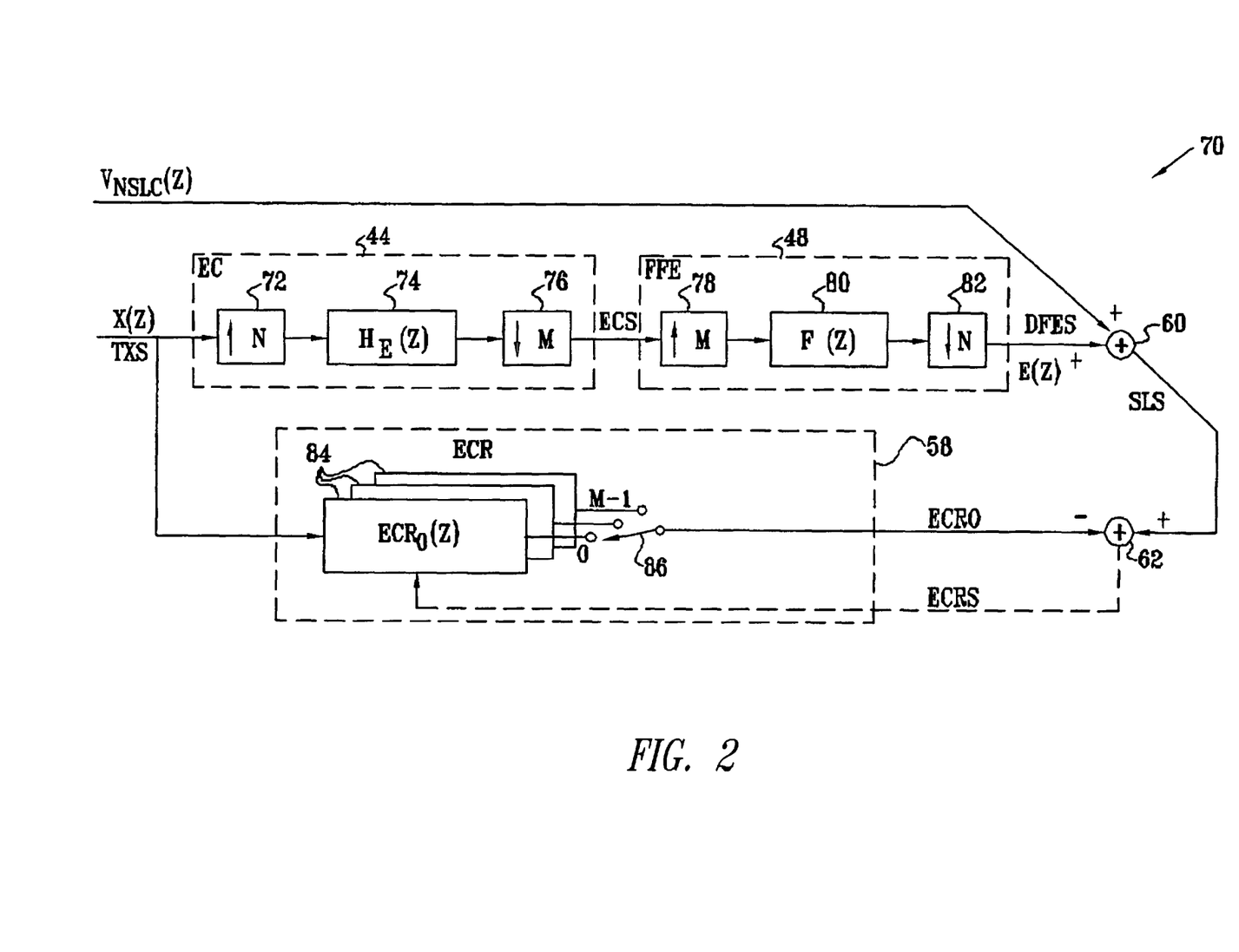
FIG. 2 is a block diagram that schematically shows a mathematical model of receiver circuitry involved in echo cancellation, in accordance with a preferred embodiment of the present invention.

FIG. 2 is a block diagram that schematically shows a mathematical model of a receiver path 70 in transceiver 20, in accordance with a preferred embodiment of the present invention. The elements of path 70 shown in FIG. 2 essentially correspond to those shown in FIG. 1 (and this analysis can be applied to the implementation shown in FIG. 3, below, as well). These elements are shown here in detail as an aid in understanding the principles of operation of the convergence acceleration process in the transceiver.

The operation of echo canceller 44 is represented in terms of a transversal filter 74, having $l_{EC}$ taps. The overall response of the filter is given by the impulse response of the residual echo, $H_E(Z)=H_{ECHO}(z)-H_{EC}(z)$, wherein $H_{ECHO}(Z)$ is the echo response from TXS to the location of ECS; and $H_{EC}(z)$ is the response of echo canceller 44. In order to take into account the possibility that FFE 48 operates at a non-integer rate of N/M times the symbol rate (M and N mutually-prime integers), transversal filter 74 is modeled as running at a sample rate NX, i.e., N times the transmitted symbol rate X. Therefore, from a conceptual point of view, the input symbols X(z) are first upsampled by an expander 72. The echo-canceled samples ECS are obtained by down-sampling the output of filter 74 by a factor M in a decimator 76. A similar arrangement of upsampling and/or downsampling may be used to adjust the output rate of the echo canceller when the transmitted symbol rate of the transceiver is different from the received symbol rate.

FFE 48 is similarly represented by an expander 78, which upsamples ECS by M, followed by a filter 80 with response F(z). The filtered samples are downsampled by N in a decimator 82, so that the equalized samples DFES are generated at the received symbol rate. Alternatively, when equalization is performed at the symbol rate, M and N are equal, and may simply both be set to 1.

The output of FFE 48 contains the residual echo signal E(z). Assuming no decision errors by slicer 50, the signal SLS that is output by summer 60 is the sum of the residual echo E(z), together with inter-symbol interference (ISI) and additive noise. Thus, SLS can be modeled by summing a noise source $V_{NSLC}(Z)$, representing the ISI and additive noise, with E(z). When the coefficients of FFE 48 and DFE 52 have converged to the minimum mean-square-error solution, $V_{NSLC}(z)$ becomes a white noise source. DFE 52 can thus be omitted from the model.

ECR 58 comprises M phases 84, labeled $ECR_0 \ldots ECR_{M-1}$, each of which is a multi-tap filter of length $l_{ECR}$. (When equalization is performed at the symbol rate, a single phase 84 is sufficient, and the derivation below is simplified accordingly.) A switch 86 schematically represents selection of the appropriate phase to activate for each successive symbol. The phases alternate in sequence from one symbol interval to the next, cycling through all the phases, so that the selected phase p for symbol number n is given by p=nmodM. The sum of the phases depends directly on the echo, while the differences among the phases correspond to aliases of the echo, as described in greater detail below.

To determine the relationship between the tap coefficients of ECR 58, $h_{ECR}$, and those of echo canceller 44, $h_{EC}$, we start by computing E(z), the z-transform of the residual echo interference, based on the transmitted symbols X(z) and the response F(z) of the FFE at rate NX:

$$E(z) = \{\lfloor ((X(z^N) \cdot H_E(z)) \uparrow M] \cdot F(z)\} \downarrow N \quad (3)$$

Here M-fold decimation and N-fold expansion are denoted by $\downarrow M$ and $\uparrow N$, respectively. Expanding equation (3) using $$W_n = \exp\left(\frac{j2\pi}{n}\right)$$

gives:

$$E(z) = \left\{ \frac{F(z)}{M} \cdot \sum_{k=0}^{M-1} X\left((z \cdot W_M^k)^N\right) \cdot H_E(z \cdot W_M^k) \right\} \downarrow N \quad (4)$$

-continued $$= \sum_{k=0}^{M-1} X(z \cdot W_M^{kN}) \cdot \left\{ \left( \frac{F(z)}{M} \cdot H_E(z \cdot W_M^k) \right) \downarrow N \right\}$$

Thus, as noted above, E(z) has M components, one depending on the echo directly (i.e., $H_E(z)$), and the others on echo aliases ($H_E(z \cdot W_M^k)$, for $k \neq 0$). If ECR 58 were simply allowed to adapt on all the transmitted symbols, it would converge to $(F(z) \cdot H_E(Z)/M) \downarrow N$, thus ignoring the aliases. ECR 58 accounts for the aliases, however, by using M phases 84 ($ECR_0 \ldots ECR_{M-1}$), wherein the p-th phase $ECR_p$ adapts only on the samples e(n) for which p=n mod M. It can be shown that phase p of E(z) is a decimation by M of a linear, time-invariant function of X(z), with a different linear function for each p. For each phase 84 of ECR 58, receiving its samples e(n) in the proper alternation, LMS adaptation will cause the respective phase response $ECR_p$ to converge to:

$$ECR_P(z) = \sum_{k=0}^{M-1} W_M^{-kNP} \cdot \left\{ \left( \frac{F(z \cdot W_M^{-k})}{M} \cdot H_E(z) \right) \downarrow N \right\} \quad (5)$$

In terms of the tap coefficients $ECR_p(m)$ of phases 84, the phase response can be expressed as:

$$ECR_P(m) = \sum_{k=0}^{M-1} \frac{1}{M} \cdot \left( \sum_{n=0}^{l_{EC}-1} h_E(n) \cdot f(mN-n) \cdot W_M^{k(mN-n-pN)} \right) \quad (6)$$

Here $h_E(n)$ is the n-th tap of the residual echo in signal ECS, and f(n) is the n-th tap of FFE 48. Summing over k gives the simplified form:

$$ECR_P(m) = \sum_{n=0}^{l_{EC}-1} h_E(n) \cdot f(mN-n) \cdot \delta(mN-n = pN \bmod M) \quad (7)$$

The response of ECR 58 can be summarized in matrix form as follows:

$$h_{ECR} \equiv \begin{bmatrix} ECR_0 \\ \ldots \\ ECR_P \\ \ldots \\ ECR_{M-1} \end{bmatrix} = F \cdot h_E + V \quad (8)$$

Here $ECR_p$ is the vector of taps m for phase p of ECR 58, and $h_{ECR}$ is a concatenation of all the ECR phases; V(n) is the adaptation noise (a vector process of dimension, $$F = \begin{bmatrix} F_0 \\ \ldots \\ F_P \\ \ldots \\ F_{M-1} \end{bmatrix}.$$

Each $F_p$ matrix is an $l_{ECR} \times l_{EC}$ matrix defined as $F_p = \{F_{m,n}\}|_{m=0\ldots l_{ECR}-1, n=0\ldots l_{EC}-1}$, with $$F_P(m,n) = \begin{cases} 0 & : m \cdot N - n < 0 \\ f(m \cdot N - n) \cdot \delta(m \cdot N - n = p \cdot N \bmod M) & : 0 \leq m \cdot N - n \leq 1_{FFE} \\ 0 & : 1_{FFE} \leq m \cdot N - n \end{cases}$$

In the common case of N=3, M=2 (i.e., a 1.5× fractionally-spaced equalizer), for example, ECR 58 will have two phases, in which $F_0$ includes only the even taps of FFE 48, while $F_1$ includes only the odd taps of the FFE. Thus, $$h_{ECR} = \begin{bmatrix} F_0 \\ F_1 \end{bmatrix} \cdot h_E + V \quad (9)$$

Assuming FFE 48 has an even number of taps, the components of $h_{ECR}$ are as follows:

$$F_0 = \begin{pmatrix} f_0 & 0 & 0 & 0 & 0 & 0 & 0 & 0 & 0 & 0 \\ 0 & f_2 & 0 & f_0 & 0 & 0 & 0 & 0 & 0 & \cdots \\ f_6 & 0 & f_4 & 0 & f_2 & 0 & f_0 & 0 & \cdots & \\ 0 & f_8 & 0 & f_6 & 0 & f_4 & 0 & \cdots & & 0 \\ f_{12} & 0 & f_{10} & 0 & f_8 & 0 & \cdots & & 0 & f_{1_{FFE}-16} \\ 0 & f_{14} & 0 & f_{12} & 0 & \cdots & & 0 & f_{1_{FFE}-12} & 0 \\ f_{18} & 0 & f_{16} & \cdots & & 0 & f_{1_{FFE}-8} & 0 & f_{1_{FFE}-10} & \\ 0 & \cdots & & & 0 & f_{1_{FFE}-4} & 0 & f_{1_{FFE}-6} & 0 & \\ & \cdots & 0 & 0 & 0 & f_{1_{FFE}-2} & 0 & f_{1_{FFE}-4} & & \\ & \cdots & 0 & 0 & 0 & 0 & 0 & 0 & 0 & \end{pmatrix}$$

$$F_1 = \begin{pmatrix} 0 & 0 & 0 & 0 & 0 & 0 & 0 & 0 & 0 & 0 \\ f_3 & 0 & f_1 & 0 & 0 & 0 & 0 & 0 & 0 & \cdots \\ 0 & f_5 & 0 & f_3 & 0 & f_1 & 0 & 0 & \cdots & \\ f_9 & 0 & f_7 & 0 & f_5 & 0 & f_3 & \cdots & & f_{1_{FFE}-19} \\ 0 & f_{11} & 0 & f_9 & 0 & f_7 & \cdots & & f_{1_{FFE}-15} & 0 \\ f_{15} & 0 & f_{13} & 0 & f_{11} & \cdots & & f_{1_{FFE}-11} & 0 & f_{1_{FFE}-13} \\ 0 & f_{17} & 0 & \cdots & & f_{1_{FFE}-7} & 0 & f_{1_{FFE}-9} & 0 & \\ f_{21} & \cdots & & f_{1_{FFE}-3} & 0 & f_{1_{FFE}-5} & 0 & f_{1_{FFE}-7} & & \\ & \cdots & 0 & 0 & f_{1_{FFE}-1} & 0 & f_{1_{FFE}-3} & 0 & & \\ & \cdots & 0 & 0 & 0 & 0 & 0 & 0 & f_{1_{FFE}-1} & \end{pmatrix}$$

Assuming the adaptation noise V(n) is white and Gaussian, a maximum likelihood (ML) approach can be used to find the correction that must be applied to the tap coefficients of echo canceller 44, based on the adapted coefficients $h_{ECR}$ of ECR 58, in order to cancel the residual echo response $h_E$. The cost function to be minimized, $C(h_E)$, is defined in the following least-square (LS) form:

$$C(h_E) \equiv \|v\|^2 = \|h_{ECR} - F \cdot h_E\|^2 \quad \text{(equation 10)}$$

$$= \sum_{p=0}^{M-1} \sum_{m=0}^{1_{ECR}-1} \left| ECR_p(m) - \sum_{n=0}^{1_{EC}-1} h_E(n) \cdot f(mN-n) \cdot \delta((mN-n-pN) \bmod M) \right|^2$$

Solving for the estimator $$\hat{h}_E = \arg\min_{h_E} C(h_E)$$

gives the generalized inverse form:

$$h_E = (F^H F)^{-1} F^H h_{ECR} \quad (11)$$

Equation (11) can be solved directly by inverting $(F^H F)$, but the complexity of inverting an $(M \cdot l_{ECR}) \times (M \cdot l_{ECR})$ matrix is considerable. If FFE 48 is non-adapting, one inversion is sufficient. To enable continuous updating of the echo cancellation coefficients while the FFE keeps adapting, however, the inversion will have to be repeated frequently.

Furthermore, if F has a large eigenvalue spread, solving equation (11) directly to find $h_E$ may increase the adaptation noise of echo canceller 44 unacceptably. To overcome this problem, it is possible to determine $h_E$ directly using a MAP (maximum a posteriori) filter, on the assumption that the adaptation noise and residual echo error of the different taps $h_E(n)$ are uncorrelated and white, i.e., $E(V \cdot V^H) = \sigma_v^2 \cdot I$ and $E(h_E \cdot h_E^H) = \sigma_{he}^2 \cdot I$, wherein I is the identity matrix, and E is the ensemble expectancy. The optimal MAP filter is then given by:

$$h_E = F^H \left( F \cdot F^H + \frac{\sigma_v^2}{\sigma_{he}^2} \cdot I \right)^{-1} h_{ECR} \quad (12)$$

Derivation of this filter is shown in Appendix A.

Instead of these direct, computation-intensive solutions, the correction to be applied to the coefficients of echo canceller 44 may be determined by a gradient descent method, based on finding gradients of the cost function of equation (10). Differentiating the cost function in terms of the taps of the residual echo $h_E$ gives the following solution for the adaptation steps of the tap coefficients of echo canceller 44, $h_{EC}(l)$, in terms of the tap coefficients $ECR_p(m)$ of phases 84 of ECR 58:

$$h_{EC}(l) = h_{EC}(l) - \mu \cdot \frac{\partial C}{\partial h_E(l)} \quad (13)$$

$$= h_{EC}(l) + \mu_{CA} \cdot \sum_{m=0}^{l_{ECR}-1} ECR_{(N \cdot m-1)/N \bmod M}(m) f(mN-1)$$

Here the phase designation $ECR_{(N \cdot m-1)/N \bmod M}$ should be understood to indicate the choice of the phase index p∈0 ... M−1 such that (N·m−1) mod M=(N·p) mod M. (Assuming M and N are chosen to be relatively prime, p is unique.) μ is the step size of the adaptation, and $\mu_{CA}=2 \cdot \mu$ is defined to simplify subsequent notation. $\mu_{CA}$ is chosen heuristically. Its value is preferably chosen so as to ensure convergence stability while bounding the adaptation noise, as derived in Appendix B.

Implementation of the principles of the present invention in the manner shown in FIG. 1 can require a very long and complex filter in ECR 58. In particular, since the residual echo response in the equalized signal at the point of DFES is given by the residual echo response in the echo-canceled signal at the point of ECS, filtered by FFE 48, the full symbol span of the ECR filter should be equal at least to the sum of the spans of echo canceller 44 and FFE 48. ECR 58 is merely a measuring device, however, and does not itself actually operate on the received signal. Therefore, not all the taps of ECR 58 must be active at all times, and it is possible to simplify ECR 58 by configuring it to make its measurements over a succession of small subsets of the taps.

Figure 3:
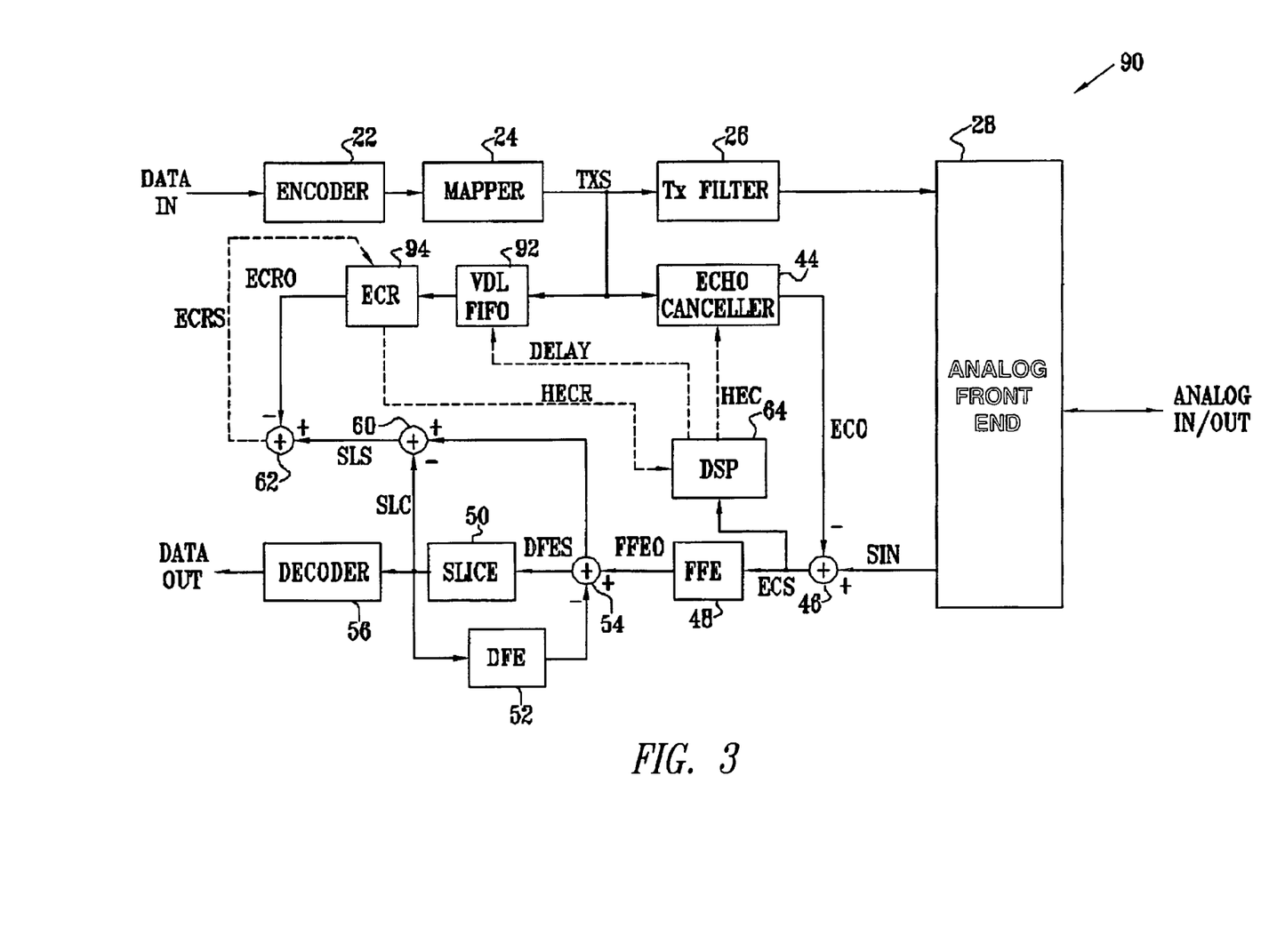
FIG. 3 is a block diagram that schematically illustrates a data transceiver, in accordance with another preferred embodiment of the present invention.

In light of this concept, FIG. 3 is a block diagram that schematically illustrates a transceiver 90, in accordance with an alternative embodiment of the present invention. Transceiver 90 comprises a residual echo cancellation circuit (ECR) 94, whose operation is similar to that of ECR 58, as described above, except that ECR 94 includes a filter whose length is only a fraction of the total symbol span of the residual echo in the equalized signal at the point of DFES. A variable delay line (VDL) 92, typically implemented as a first-in-first-out (FIFO) buffer, is used to delay the TXS input (TXS) to ECR 94, so that the ECR measures the impulse response of the residual echo in the residual error signal SLS for $N_{LAGS}$ different lags. DSP 64 concatenates the measurements at different lags to find the full complement of ECR tap coefficients and thus to update the coefficients of echo canceller 44, as described above. The number of taps measured at each lag, denoted by $l_{SEG}$, is reduced by a factor of $N_{LAGS}$ relative to the full length of the ECR filter.

In all other respects, transceiver 90 is substantially similar to transceiver 20, as described above. Although measuring the residual error in pieces slows down the convergence of echo canceller 44 in transceiver 90, the adaptation of the echo canceller in this embodiment is still typically considerably faster than the echo canceller could achieve on its own.

The feedback function given by equation (13), for determining the tap coefficients hEc of echo canceller 44 in terms of the adapted coefficients $h_{ECR}$ of ECR 58 (or ECR 94), takes into account that the ECR response is available only at the symbol rate 1/T (wherein T is the symbol period), while the echo canceller has a tap spacing of T/N. As a result of this rate mismatch, the residual echo may not be completely correctable by the ECR. If the coefficients of FFE 48 are simultaneously changing due to adaptation, there may even be instability in the convergence acceleration process.

This potential instability is preferably corrected by introducing tap leakage, $\rho_{CA}$, into the adaptation properties of the ECR. Most preferably, the tap coefficients of echo canceller 44 are themselves allowed to continue adapting, simultaneously with adaptation of the ECR, with a leakage rate $\rho_{EC}$. Therefore, the echo canceller will still converge (although at a slower rate) along directions in the $l_{EC}$-dimensional space in which the convergence acceleration matrix has zero or even negative eigenvalues. Since the adaptation of the ECR (and thus the convergence acceleration provided by the ECR and DSP) is typically orders of magnitude faster than LMS adaptation of the echo canceller, PEc is preferably much smaller than $\rho_{CA}$, i.e., $\rho_{EC}/\rho_{CA} \approx \tau_{CA}/\tau_{EC} << 1$.

Figure 4:
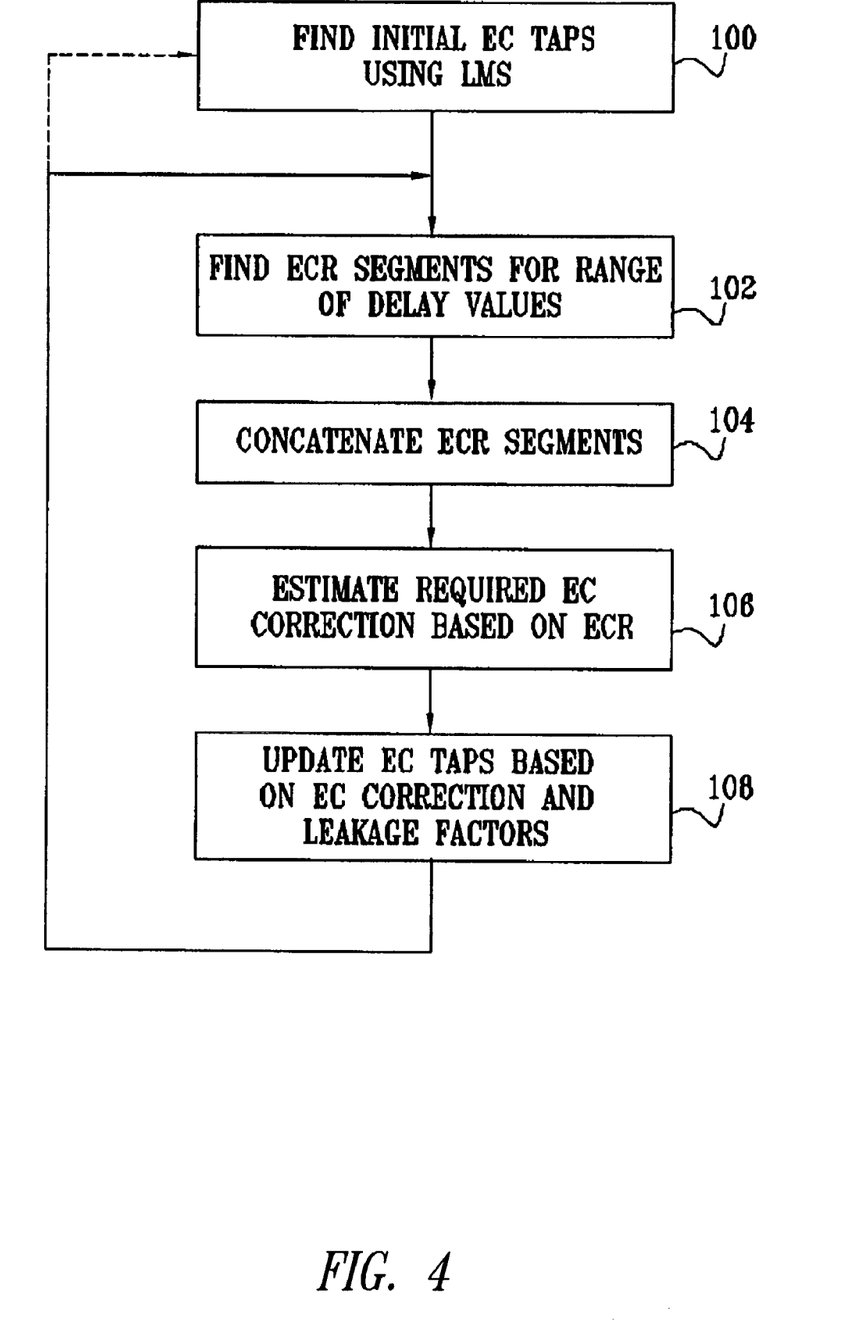
FIG. 4 is a flow chart that schematically illustrates a method for updating echo cancellation tap coefficients, in accordance with a preferred embodiment of the present invention.

FIG. 4 is a flow chart that schematically illustrates a method for updating the tap coefficients of echo canceller 44 in transceiver 90 (FIG. 3), in accordance with a preferred embodiment of the present invention. This flow chart summarizes key elements of the convergence acceleration methods described above, as they are carried out by ECR 94 together with DSP 64 and VDL 92. These methods may similarly be carried out, mutatis mutandis, by ECR 58 and DSP 64 in transceiver 20 (FIG. 1).

At start-up of transceiver 90, initial values of the tap coefficients of echo canceller 44 are determined, typically by conventional LMS adaptation of the echo canceller itself, at an initialization step 100. The initial adaptation may be carried out during a training period, using a dedicated half-duplex training mode, or by any other suitable method known in the art. Subsequently, adaptation of echo canceller 44 is preferably allowed to go on continuously, simultaneously with the convergence acceleration, as noted above. Alternatively, further adaptation of the echo canceller may be inhibited, with ECR 94 providing for all subsequent adaptation of the echo canceller tap coefficients unless retraining becomes necessary.

While transceiver 90 is running, DSP 64 controls VDL 92 to provide samples of the transmitted symbols TXS to ECR 94 at a sequence of different time lags, at a segment processing step 102. For each time lag, the ECR adapts a respective subset of the tap coefficients of all its phases (assuming the ECR includes multiple phases 84, as shown in FIG. 2). Each subset corresponds to one segment of a long polyphase transversal filter, as is used in ECR 58 (FIG. 1), such that all the subsets taken together give the coefficients for the complete filter. DSP 64 concatenates the segments together, at a concatenation step 104, in order to recover the coefficients for the complete filter.

Based on the ECR coefficients, DSP 64 estimates the correction to be applied to the coefficients of echo canceller 44, at an estimation step 106. Preferably, the DSP uses the gradient descent method expressed by equation (13), along with tap leakage as described above, to find the coefficient for each tap n of echo canceller 44, n=0: $1_{EC}$−1. For each tap n, the gradient given by equation (13) is:

$$G_{CA}(n) = \sum_{m=0}^{1_{ECR}-1} ECR_{(Nm-n)/N \bmod M}(m) f(mN - n) \quad (14)$$

As noted above, DSP 64 preferably uses separate tap leakage factors, $\rho_{CA}$ and $\rho_{EC}$, for the convergence accelerator and for normal adaptation of echo canceller 44, respectively. An accumulator vector $A_{CA}$ is defined and used by the accelerator in order to keep track of the accumulated changes in the echo canceller taps from time t=0.

For each tap n of the echo canceller at step 106, the DSP first applies tap leakage to the corresponding echo canceller coefficient independent of the convergence accelerator contribution:

$$EC(n) = (EC(n) - A_{CA}(n)) \cdot (1 - \rho_{EC}) \quad (15)$$

The DSP then updates the accumulator entry based on the latest gradient descent step, including leakage of the convergence accelerator contribution:

$$A_{CA}(n) = A_{CA}(n) \cdot (1 - \rho_{CA}) + \mu_{CA} \cdot G_{CA}(n) \quad (16)$$

Finally, at a coefficient update step 108, the DSP updates the values of the coefficients of echo canceller 44, based on both equations (15) and (16):

$$EC(n) = EC(n) + A_{CA}(n) \quad (17)$$

Steps 102 through 108 are preferably repeated each time a new estimation of the tap coefficients of ECR 94 is completed. Typically, a complete cycle of this sort takes a few thousand symbols. Therefore, the added complexity of computing equations (15) and (16) once each cycle for each coefficient does not significantly increase the overall burden on DSP 64.

The use of the method of FIG. 4 in updating the tap coefficients of echo canceller 44 typically accelerates the convergence of the echo canceller by orders of magnitude, relative to the convergence of conventional LMS adaptation. The ratio of the convergence rates, with and without acceleration by the ECR of the present invention, is dominated by the ratio $$\frac{\sigma_{XT}^2(m)}{\sigma_{FAR}^2}.$$

(For a detailed convergence analysis, see Appendix B.) In this expression, $\sigma_{XT}(m)$ accounts for cross talk and additive background noise in the echo-canceled signal, along the direction of m-th eigenvector of the acceleration matrix. $\sigma_{FAR}$ is the entire variance of the far-end signal, as defined in the Background of the Invention, which is clearly many times greater than $\sigma_{XT}(m)$. The added update time due to using $N_{LAGS}$ multiple different delays (applied by VDL 92) reduces the degree of acceleration achieved by the present invention, but the speed advantage over conventional echo cancellation methods is still very substantial.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix A—Optimal Linear Filter

At each iteration of ECR 58, an optimal estimation of the echo canceller correction $h_E$ is desired, based only on the residual echo following the equalizer, $h_{ECR}$. Assuming that the adaptation noise V and the residual echo error $h_E(n)$ are both white across coordinates and time, with a known power, i.e., $E(v \cdot v^T) = \sigma_v^2 \cdot I$, and $E(h_E \cdot h_E^T) = \sigma_{h_e}^2 \cdot I$, we derive an optimal linear filter as follows. Denoting the optimal filter by $B^H$, using the orthogonality principle gives:

$$E((h_E - B^H \cdot h_{ECR}) \cdot h_{ECR}^T) = E((h_E - B^H \cdot (F \cdot h_E + v)) \cdot (F \cdot h_E + v)^T) = 0 \Leftrightarrow$$

$$E(h_E \cdot h_E^T) \cdot F^T - B^H \cdot (F \cdot E(h_E \cdot h_E^T) \cdot F^T + E(v \cdot v^T)) =$$

$$\sigma_{h_e}^2 \cdot F^T - B^H \cdot (\sigma_{h_e}^2 \cdot F \cdot F^T + \sigma_v^2 \cdot I) = 0 \Rightarrow$$

$$B^H = \sigma_{h_e}^2 \cdot F^T \cdot (\sigma_{h_e}^2 \cdot F \cdot F^T + \sigma_v^2 \cdot I)^{-1} = F^T \cdot (F \cdot F^T + \frac{\sigma_v^2}{\sigma_{h_e}^2} \cdot I)^{-1}$$

Here F is defined as in equation (8) above. Using Singular Value Decomposition of F, i.e., $F = U \cdot \Lambda_F \cdot V^H$, gives:

$$B^H = U \cdot (\Lambda_F \Lambda_F^H + \frac{\sigma_v^2}{\sigma_{h_e}^2} \cdot I)^{-1} \cdot \Lambda_F \cdot V^H$$

Note that for $\sigma_v^2 / \sigma_{h_e}^2 = 0$, the optimal filter of equation (13) equals the generalized inverse of equation (12), since generally $$F^T \cdot (F \cdot F^T)^{-1} = (F^T F)^{-1} F^T.$$

Appendix B—Convergence Analysis

Appensix B—Convergence Analysis

This appendix presents a convergence analysis of the gradient descent method of equation (13). The analysis includes the following stages:
1. Analysis of convergence properties of the feedback/gradient descent algorithm.
2. Analysis of the adaptation noise of the feedback/gradient descent algorithm.
3. Examination of properties of ECR convergence.

Finally, the results of these three stages are combined. Using a feedback matrix B defined below, a number of special cases are examined, including the LS/ML solution, the optimum filtering/MAP solution, and the gradient descent solution.

The steepest descent step derived in equation (13) can be generalized and rewritten in a matrix form. Then, substituting from equation (8) gives the following echo canceller update formula:

$$h_{EC}^{(n+1)} = h_{EC}^{(n)} + \mu_{CA} \cdot B^H \cdot h_{ECR} \quad \text{(equation B1)}$$

-continued $$= h_{EC}^{(n)} + \mu_{CA} \cdot B^H F \cdot h_E + \mu_{CA} \cdot B^H \cdot v^{(n)}$$

Here B is a $(m \cdot l_{ECR}) \times l_{EC}$ matrix used for feedback from the ECR to the echo canceller. (In the gradient descent case represented by equation (13), B=F.) The index n refers to time instants. The recursion equation for the tap-weight error vector $h_E$ can then be written as:

$$h_E^{(n+1)} = h_{ECHO} - h_{EC}^{(n+1)} \qquad (B2)$$
$$= h_{ECHO} - (h_{EC}^{(n)} + \mu_{CA} \cdot B^H F \cdot h_E^{(n)} + \mu_{CA} \cdot B^H \cdot v^{(n)})$$
$$= (I - \mu_{CA} \cdot B^H F) \cdot h_E^{(n)} - \mu_{CA} \cdot B^H \cdot v^{(n)}$$

Since F and B are not square matrices, we apply singular value decomposition (SVD) analysis to equation (B2). Assume $F = U \cdot \Lambda_F \cdot V^H$, with $\Lambda_F$ a diagonal matrix of the same dimension as F; and U and V are unitary matrices, of dimensions $(M \cdot l_{ECR}) \times (M \cdot l_{ECR})$ and $l_{EC} \times l_{EC}$, respectively. We now choose $B = U \cdot \Lambda_B \cdot V^H$, with $\Lambda_B$ a diagonal $(M \cdot l_{ECR}) \times l_{EC}$ matrix. This choice of B facilitates easy control of convergence rate and adaptation noise. The tap-weight error vector $h_E$ can now be rewritten as $$h_E^{(n+1)} = (I - \mu_{CA} \cdot V \Lambda_B^H U^H U \Lambda_F V^H) h_E^{(n)} - \mu_{CA} \cdot V \Lambda_B^H U^H \cdot v^{(n)} \qquad (B3)$$
$$= V[(I - \mu_{CA} \cdot \Lambda_B^H \Lambda_F) V^H \cdot h_E^{(n)} - \mu_{CA} \cdot \Lambda_B^H U^H v^{(n)}]$$

We define $g_E = V^H \cdot h_E$, which admits the following relation:

$$g_E^{(n+1)} = V^H \cdot h_E^{(n+1)} = (I - \mu_{CA} \cdot \Lambda_B^H \Lambda_F) \cdot g_E^{(n)} - \mu_{CA} \cdot \Lambda_B^H \cdot U^H \cdot v^{(n)} \qquad \text{(equation B4)}$$

Solving this equation for given initial conditions $g_E^{(0)}$ and noise $v^{(k)}$ gives:

$$g_E^{(n+1)} = (I - \mu_{CA} \cdot \Lambda_B^H \Lambda_F)^{(n+1)} \cdot g_E^{(0)} - \mu_{CA} \cdot \sum_{k=0}^{n} (I - \mu_{CA} \cdot \Lambda_B^H \Lambda_F)^{n-k} \cdot \Lambda_B^H \cdot U^H \cdot v^{(k)} \qquad (B5)$$

Since $\Lambda_B^H \Lambda_F$ is a square $l_{EC} \times l_{EC}$ diagonal matrix, we can view the equation for $g_E^{(n+1)}$ as system of $l_{EC}$ single-variable independent equations.

The error associated with $g_E(m)$ (i.e., the m-th equation, or coordinate m) decays according to $(1 - \mu_{CA} \cdot \lambda_B^*(m) \lambda_F(m))^n$, wherein $\lambda_F(m) = \Lambda_F(m, m)$ and $\lambda_B(m) = \Lambda_B(m,m)$. To prevent divergence, we require $|1 - \mu_{CA} \cdot \lambda_B^*(m) \lambda_F(m)| < 1$. One extreme choice for this purpose is $\lambda_B^*(m) = (\lambda_F(m))^{-1}$ for $\lambda_F(m) \neq 0$, and 0 otherwise, corresponding to the generalized inverse of equation (11). This choice minimizes the cost function of equation (10), and thus is optimal in the least square/maximum likelihood sense. It does not trade off adaptation noise (var(v)) against tracking noise (var($g_E$)), and thus may give inferior results in terms of convergence speed.

To obtain the adaptation noise, we assume that $v^{(n)}$ is a white process whose entries are independent and identically distributed, i.e., $\forall m_1, m_2, n_1, n_2: E((v^{(n_1)}(m_1))^* \cdot v^{(n_2)}(m_2))$
$= \delta(m_1 - m_2) \cdot (n_1 - n_2) \cdot \sigma_v^2$. The adaptation noise power for $g_E(M)$ converges for large n to:

$$\sigma_{AD}(m)^2 = \frac{\mu_{CA}^2 \cdot |\lambda_B(m)|^2 \cdot \sigma_V^2 \sum_{k=0}^{M \cdot l_{ECR}-1} |U(k, m)|^2}{1 - |1 - \mu_{CA} \cdot \lambda_B^*(m) \cdot \lambda_F(m)|^2} \qquad (B6)$$
$$= \frac{\mu_{CA}^2 \cdot |\lambda_B(m)|^2 \cdot \sigma_V^2}{1 - |1 - \mu_{CA} \cdot \lambda_B^*(m) \cdot \lambda_F(m)|^2}$$

Here U is defined by SVD decomposition of F, i.e. $F = U \cdot \Lambda_F \cdot V^H$. Note that $$\sum_{k=0}^{EPLen-1} |U(k, m)|^2 = 1,$$

since U is a $(M \cdot l_{ECR}) \times (M \cdot l_{ECR})$ unitary matrix.

We will use this analysis to choose a good feedback (B) matrix. For a given convergence rate $|1 - \mu_{TA} \cdot \lambda_B^*(m) \cdot \lambda_F(m)|$, it is obviously desirable to minimize $|\lambda_B(m)|$ in order to decrease the adaptation noise. This implies $\text{Im}(\lambda_B^*(m) \cdot \lambda_F(m)) = 0$ and $\arg(\lambda_B(m)) = \arg(\lambda_F(m))$. Thus, assuming $|\mu_{CA} \cdot \lambda_B^*(m) \cdot \lambda_F(m)| \ll 1$:

$$\sigma_{AD}(m)^2 = \frac{\mu_{CA}^2 \cdot |\lambda_B(m)|^2 \cdot \sigma_V^2}{2 \cdot \mu_{CA} \cdot \lambda_B^*(m) \cdot \lambda_F(m) - |\mu_{CA} \cdot \lambda_B^*(m) \cdot \lambda_F(m)|^2} \qquad (B7)$$
$$\approx \frac{\mu_{CA} \cdot \lambda_B(m) \cdot \sigma_V^2}{2 \cdot \lambda_F(m)}$$

We now consider various choices of feedback matrix B, starting with the optimal MAP solution. Using equation (12), and assuming we know $\sigma_v^2$ and $\sigma_{he}^2$ as defined there, the optimal filtering/MAP solution is:

$$\lambda_B(m) = \frac{\sigma_{he}^2 \cdot \lambda_F(m)}{\sigma_{he}^2 \cdot |\lambda_F(m)|^2 + \sigma_V^2} \qquad (B8)$$

Let $$\gamma = \frac{\sigma_V^2}{\sigma_{he}^2 \cdot |\lambda_F(m)|^2}.$$

For $\gamma \ll 1$, the adaptation noise is not significant, so that equation (B8) gives the least square solution again. According to equation (B7), for this case, the adaptation noise is inversely proportional to $\lambda_F(m)^2$, so that small values (or zero) of $\lambda_F(m)$ are problematic. For $\gamma \gg 1$, the tracking noise is not significant, so that $\lambda_B(m)$ is proportional to $\lambda_F(m)$, as in the gradient descent algorithm defined above, wherein $\lambda_B(m) = \lambda_F(m)$. For this choice of $\gamma$, the adaptation noise is white:

$$\sigma_{AD}(m)^2 \approx \frac{1}{2}\mu_{CA} \cdot \sigma_V^2 \qquad (B9)$$

The next step is to analyze the convergence of ECR 58. The ECR convergence rate and adaptation noise will then be combined with the preceding results in order to produce overall convergence parameters. The ECR update formula has the following form, wherein each phase is adapted only once in each M symbols:

$$ECR_p(n+1) = ECR_p(n) + \mu_{ECR} \cdot (d(n \cdot M+p) - ECR_P^T(n) \cdot x(n \cdot M+p)) \qquad \text{(equation B10)}$$

Here x(n) are the vectors of the transmitted symbols TXS, having cross correlation $R_{XX} = I \cdot \sigma_x^2$, wherein $\sigma_x^2$ is the power of the transmitted symbols. d(n) is the signal that ECR 58 attempts to estimate; and $\mu_{ECR}$ is the LMS adaptation step size of the ECR.

Convergence of the elements of ECR depends on two factors: the period (in symbols) allotted for ECR to converge (denoted $t_D$), and the adaptation constant $\mu_{ECR}$. Increasing $\mu_{ECR}$ speeds up ECR convergence, but it also increases adaptation noise. Excessive $\mu_{ECR}$, however, will make ECR adaptation diverge. If $t_D$ and $\mu_{ECR}$ are such that ECR does not fully converge, $\mu_{CA}$ (the gain of the convergence acceleration method described above) can be set to compensate for the situation. Thus, there is a tradeoff between $\mu_{ECR}$, $t_D$ and $\mu_{CA}$, which is further analyzed hereinbelow.

We can use standard LMS analysis (as described, for example, in the above-mentioned book by Haykin) to analyze the adaptation characteristics of ECR 58. Although LMS analysis usually uses the independence assumption, which is not applicable for ECR, the results of this analysis are still useful for small adaptation step size $\mu_{ECR}$. Defining $\epsilon(n) = ECR_P^{OPT} - ECR_P(n)$, and $k(n) = \text{diag}[E(\epsilon(n) \cdot \epsilon(n)^H)]$, it can be shown that:

$$E(\varepsilon(n)) \approx (1 - \mu_{ECR} \cdot \sigma_x^2)^n \cdot \varepsilon(0) \qquad (B11)$$
$$= (1 - \mu_{ECR} \cdot \sigma_x^2)^n \cdot ECR_P^{OPT}$$

$ECR_p(0) = 0$, since ECR starts zeroed, and subsequently $\epsilon(0) = ECR_P^{OPT}$. Therefore, $$k(n) = A^n \cdot k(0) + \mu_{ECR}^2 \cdot \sigma_{NSLC}^2 \sum_{i=0}^{n-1} A^n \cdot \lambda_X \qquad (B12)$$

$$k_m(\infty) \approx \frac{\mu_{ECR} \sigma_{NSLC}^2}{2 - \mu_{ECR} \cdot \sigma_x^2} \qquad (B13)$$

In these equations, $$n = \frac{t_D}{M},$$

since the ECR phase is adapted once in M symbols; $A = \mu_{ECR}^2 \cdot \lambda_X \lambda_X^H + (I - \mu_{ECR} \cdot \sigma_x^2 \cdot I)^2$; $\lambda_X = \text{diag}(\sigma_x^2 \cdot I)$; $\sigma_{NSLC}^2$ is the power of the noise signal at slicer 50; and $k_m(n)$ is the m-th component of k(n).

In relation to equation (8) above, it was assumed that ECR converges completely, and thus that the convergence rate of the echo canceller is determined only by $\mu_{CA}$. It is possible, however, that only partial convergence is reached by the filter in ECR 58, i.e., $h_{ECR} = \mu_1 \cdot F \cdot h_E + V$, wherein using equation (B11), $\mu_1 = 1 - (1 - \mu_{ECR} \cdot \sigma_x^2)^{t_D/M} << 1$. As a result, the adaptation step given by equation (B1) becomes $h_{EC}^{(n+1)} = h_{EC}^{(n)} + \mu_{CA} \cdot \mu_1 \cdot B^H \cdot h_{ECR}$ (including multiplication by $\mu_1$). Thus, increasing $\mu_{CA}$ can compensate for low $\mu_{ECR}$. Reducing $\mu_{ECR}$, however, reduces the ECR adaptation noise v(m), while increasing $\mu_{CA}$ increases the adaptation noise gain. Therefore, different settings of $\mu_{CA}$ and $\mu_{ECR}$ with the same product $\mu_{CA} \cdot \mu_1$ do not in general produce identical systems.

To facilitate subsequent analysis, we normalize the ECR response by $\mu_1$:

$$h_{ECR}^{NORM} = F \cdot h_E + \frac{v}{\mu_1} \qquad (B14)$$

The expectation value of $h_{ECR}^{NORM}$ is the same as for full convergence, and is independent of $\mu_{ECR}$ and $t_D$. The only difference between the full- and partial-convergence cases is in the adaptation noise. For $\mu_1 \to 1$, it is useless to further increase $\mu_{ECR}$, since based on equation (B13), the adaptation noise V increases linearly, while the effect of increasing $\mu_1$ diminishes. We therefore expect effective values of $\mu_{ECR}$ to allow only partial ECR convergence.

To further simplify the subsequent analysis, we consider only the extreme case of $t_D \cdot \mu_{ECR} << 1$, so that $\mu_1 << 1$. In this case, equation (B11) gives:

$$E(ECR_p(t_D)) \approx \frac{t_D \cdot \mu_{ECR} \cdot \sigma_x^2}{M} \cdot ECR_P^{OPT} \qquad (B15)$$

Since $\mu_{ECR} << 1$, $A \approx (I - \mu_{ECR} \cdot \sigma_x^2 \cdot I)^2$, and equation (B12) can be used to compute the variance $\sigma_{ECR}^2$, which is common to all the $ECR_p(t_D)$ components:

$$\sigma_{ECR}^2 = \mu_{ECR}^2 \cdot \sigma_{NSLC}^2 \frac{1 - (1 - \mu_{ECR} \cdot \sigma_x^2)^{\frac{2 \cdot t_D}{M}}}{1 - (1 - \mu_{ECR} \cdot \sigma_x^2)^2} \cdot \sigma_x^2 \qquad (B16)$$

The "normalized" ECR ($h_{ECR}^{NORM}$) variance, $\sigma_v^2$, is given by:

$$\sigma_V^2 = \frac{\sigma_{ECR}^2}{\mu_1^2} \qquad (B17)$$
$$\approx \frac{M^2}{(t_D \cdot \mu_{ECR} \cdot \sigma_x^2)^2} \cdot \frac{2 \cdot \mu_{ECR}^2 \cdot \sigma_{NSLC}^2 \cdot t_D}{(2 - \mu_{ECR} \cdot \sigma_x^2) \cdot M} \cdot \sigma_x^2$$
$$\approx \frac{M \cdot \sigma_{NSLC}^2}{t_D \cdot \sigma_x^2}$$

Note that the normalized variance is not dependent on $\mu_{ECR}$, assuming $t_D \cdot \mu_{ECR} << 1$.

Finally substituting $\sigma_v^2$ into equation (B9) gives:

$$\sigma_{AD}(m)^2 \approx \frac{1}{2}\mu_{CA} \cdot \frac{M \cdot \sigma_{NSLC}^2}{t_d \cdot \sigma_x^2} \quad \text{(B18)}$$

$$= \frac{\mu_{CA} \cdot \lambda_F^2(m)}{2 \cdot \lambda_F^2(m)} \cdot \frac{M \cdot \sigma_{NSLC}^2}{t_d \cdot \sigma_x^2}$$

$$= R(m) \cdot \frac{M \cdot \sigma_{NSLC}^2}{2 \cdot \lambda_F^2(m) \cdot \sigma_x^2}$$

$$R(m) \equiv \frac{1}{\tau} \approx \frac{\mu_{CA} \cdot \lambda_F^2(m)}{t_D}$$

is the effective adaptation rate (in units of symbols$^{-1}$) along the direction of the m-th eigenvector direction according to equation (B4). $\lambda_F(m)$ is the eigenvalue of the m-th eigenvector.

The invention claimed is:

1. A receiver for receiving an incoming signal over a communication medium, the receiver comprising:
    an echo canceller, which is adapted to receive an outgoing signal transmitted over the communication medium, and to process the outgoing signal using a set of variable processing coefficients in order to generate an echo cancellation signal;
    a summer, which is coupled to combine the incoming signal with the echo cancellation signal so as to generate an echo-cancelled signal;
    an equalizer, which is adapted to apply an equalization operation to the echo-cancelled signal so as to generate an equalized signal;
    a residual error echo cancellation circuit, which is coupled to receive and process the equalized signal so as to adaptively generate a residual-corrected output; and
    a digital signal processor coupled to receive tap coefficients of the residual error echo cancellation circuit and update the set of variable processing coefficients of the echo canceller.

2. A receiver according to claim 1, wherein the residual error echo cancellation circuit is adapted to estimate a residual echo component in the equalized signal, and to generate the residual-corrected output so as to cancel the residual echo component.

3. A receiver according to claim 2, further comprising a decision unit, which is coupled to receive the equalized signal and to determine output data values responsive thereto, wherein the residual error echo cancellation circuit comprises a subtractor, which is coupled to take a difference between the equalized signal and the output data values in order to determine the residual echo component.

4. A receiver according to claim 3, wherein the residual error echo cancellation circuit is coupled to receive the outgoing signal, and to process the outgoing signal together with the residual echo component in order to generate the residual-corrected output.

5. A receiver according to claim 4, wherein the residual error echo cancellation circuit comprises a digital filter having multiple taps, having respective tap coefficients associated therewith, and wherein the digital filter is coupled to apply the digital filter to the outgoing signal while adjusting the tap coefficients responsive to the residual echo component, and wherein the variable processing coefficients of the echo canceller are updated responsive to the adjusted tap coefficients of the digital filter.

6. A receiver according to claim 1, wherein the echo canceller comprises a first digital filter having first taps, and wherein the variable processing coefficients comprise first tap coefficients, which are respectively associated with the first taps, and wherein the echo canceller is coupled to apply the first digital filter to the outgoing signal in order to generate the echo cancellation signal, and
    wherein the residual error echo cancellation circuit comprises a second digital filter having second taps, having respective second tap coefficients associated therewith, and wherein the residual error echo cancellation circuit is coupled to apply the second digital filter to the outgoing signal so as to generate a filter output, while adjusting the second tap coefficients responsive to the filter output, and wherein the digital signal processor updates the first tap coefficients in response to the adjusted second tap coefficients.

7. A receiver according to claim 6, wherein the second digital filter comprises multiple phases, comprising respective subsets of the second taps, and wherein the residual error echo cancellation circuit is adapted to determine the second tap coefficients for all of the multiple phases, for use in updating the first tap coefficients.

8. A receiver according to claim 6, wherein residual error echo cancellation circuit comprises a variable delay element, which is coupled to convey the outgoing signal to the second digital filter at a plurality of different time lags, and wherein the residual echo cancellation circuit is adapted to determine the second tap coefficients for each of the different time lags, for use in updating the first tap coefficients.

9. A receiver according to claim 6, wherein the residual error echo cancellation circuit is adapted to apply a maximum likelihood estimator to the adjusted second tap coefficients in order for the digital signal processor to determine updated values of the first tap coefficients.

10. A receiver according to claim 6, wherein the residual error echo cancellation circuit is adapted to apply a maximum a posteriori (MAP) filter to the adjusted second tap coefficients in order for the digital signal processor to determine updated values of the first tap coefficients.

11. A receiver according to claim 6, wherein the residual error echo cancellation circuit is adapted to find a gradient of the adjusted second tap coefficients in order for the digital signal processor to determine an increment to be applied to update the first tap coefficients.

12. A receiver according to claim 11, wherein the digital signal processor is adapted to update the first tap coefficients while applying a leakage to at least one of the first and second tap coefficients.

13. A receiver according to claim 1, wherein the equalizer comprises a time-domain equalizer.

14. A receiver according to claim 13, wherein the time-domain equalizer comprises a feed-forward equalizer (FFE).

15. A receiver according to claim 14, wherein the FFE is adapted to operate on the echo-cancelled signal at an equalization rate that is a non-integer fraction of a symbol rate of the incoming signal, and wherein the residual error echo cancellation circuit comprises a digital filter having multiple phases, and is coupled to process the outgoing signal using the multiple phases in order for the digital signal processor to update the variable processing coefficients.

16. A receiver according to claim 14, further comprising a slicer, which is coupled to receive the equalized signal and to determine output data values responsive thereto, wherein the residual error echo cancellation circuit comprises a subtractor, which is coupled to take a difference between the equalized signal and the residual-corrected output in order to determine an error signal for use in updating the variable processing coefficients.

17. A receiver according to claim 1, wherein the equalizer comprises a frequency-domain equalizer.

18. A receiver according to claim 17, wherein the incoming and outgoing signals are multi-tone signals.

19. A receiver according to claim 1, wherein the incoming signal is received by the receiver at a first rate, and the outgoing signal is transmitted at a second rate, which is different from the first rate.

20. A method for processing an incoming signal received over a communication medium, the method comprising:
    processing an outgoing signal, which is to be transmitted over the communication medium, using a set of variable processing coefficients in order to generate an echo cancellation signal;
    combining the incoming signal with the echo cancellation signal so as to generate an echo-cancelled signal;
    applying an equalization operation to the echo-cancelled signal so as to generate an equalized signal;
    processing the equalized signal so as to adaptively generate a residual-corrected output; and
    receiving and processing a set of tap coefficients used to generate the residual-corrected output and updating the set of variable processing coefficients used to generate the echo cancellation signal.

21. A method according to claim 20, wherein processing the equalized signal comprises estimating a residual echo component in the equalized signal, in order to generate the residual-corrected output so as to substantially cancel the residual echo component.

22. A method according to claim 21, further comprising determining output data values responsive to the equalized signal, wherein operating on the residual echo component comprises taking a difference between the equalized signal and the output data values in order to determine the residual echo component.

23. A method according to claim 22, wherein operating on the residual echo component comprises processing the outgoing signal together with the residual echo component in order to update the variable processing coefficients.

24. A method according to claim 23, wherein processing the outgoing signal comprises applying a digital filter having multiple taps to the outgoing signal, the taps having respective tap coefficients associated therewith, wherein the variable processing coefficients are updated responsive to the adjusted tap coefficients of the digital filter.

25. A method according to claim 20, wherein processing the outgoing signal comprises applying a first digital filter having first taps to the outgoing signal in order to generate the echo cancellation signal, wherein the variable processing coefficients comprise first tap coefficients, which are respectively associated with the first taps, and
    wherein processing the equalized signal comprises applying a second digital filter having second taps to the outgoing signal, the second taps having respective second tap coefficients associated therewith, so as to generate a filter output, while adjusting the second tap coefficients responsive to the filter output, wherein the first tap coefficients are updated responsive to the adjusted second tap coefficients.

26. A method according to claim 25, wherein the second digital filter comprises multiple phases, comprising respective subsets of the second taps, and wherein adjusting the second tap coefficients comprises determining the second tap coefficients for all of the multiple phases, for use in updating the first tap coefficients.

27. A method according to claim 25, wherein applying the second digital filter comprises applying a variable delay to the outgoing signal, so that the second digital filter receives symbols from the outgoing signal at a plurality of different time lags, and wherein adjusting the second tap coefficients comprises determining the second tap coefficients for each of the different time lags, for use in updating the first tap coefficients.

28. A method according to claim 25, wherein processing the equalized signal comprises applying a maximum likelihood estimator to the adjusted second tap coefficients in order to determine updated values of the first tap coefficients.

29. A method according to claim 25, wherein processing the equalized signal comprises applying a maximum a posteriori (MAP) filter to the adjusted second tap coefficients in order to determine updated values of the first tap coefficients.

30. A method according to claim 25, wherein processing the equalized signal comprises finding a gradient of the adjusted second tap coefficients in order to determine an increment to be applied to update the first tap coefficients.

31. A method according to claim 30, wherein updating the first tap coefficients comprises applying a leakage to at least one of the first and second tap coefficients.

32. A method according to claim 20, wherein applying the equalization operation comprises applying time-domain equalization.

33. A method according to claim 32, wherein applying the time-domain equalization comprises applying a feed-forward equalizer (FFE) to the echo-cancelled signal.

34. A method according to claim 33, wherein applying the FFE comprises operating on the echo-cancelled signal at an equalization rate that is a non-integer fraction of a symbol rate of the incoming signal, and wherein processing the equalized signal comprises applying a digital filter having multiple phases to the outgoing signal in order to update the variable processing coefficients.

35. A method according to claim 33, and comprising determining output data values responsive to the equalized signal, wherein processing the equalized signal comprises taking a difference between the equalized signal and the output data values in order to determine an error signal for use in updating the variable processing coefficients.

36. A method according to claim 20, wherein applying the equalization operation comprises applying frequency-domain equalization.

37. A method according to claim 36, wherein the incoming and outgoing signals are multi-tone signals.

38. A method according to claim 20, wherein the incoming signal is received at a first rate, and the outgoing signal is transmitted at a second rate, which is different from the first rate.

39. An apparatus, comprising:
    echo cancellation signal generating means for generating an echo cancellation signal from an outgoing signal using a set of variable processing coefficients;
    echo-cancelled signal generating means for generating an echo-cancelled signal by combining an incoming signal with the echo cancellation signal;
    equalizing means for generating an equalized signal by applying an equalization operation to the echo-cancelled signal;

a residual error echo cancellation means for receiving and processing the equalized signal so as to adaptively generate a residual-corrected output; and a processing means for receiving a set of tap coefficients used to generate the residual-corrected output and updating the set of variable processing coefficients used to generate the echo cancellation signal.

40. The apparatus of claim 39 wherein the residual error echo cancellation means is operable to estimate a residual echo component in the equalized signal and to cancel the residual echo component.

41. The apparatus of claim 40, further comprising:
decision means for receiving the equalized signal and determining output data values in response thereto.

42. The apparatus of claim 41 wherein the residual error echo cancellation means comprises subtractor means for determining the residual echo component based on a difference between the equalized signal and the output data values.

43. The apparatus of claim 42 wherein the processing means is operable to update the variable processing coefficients based on processing the outgoing signal together with the residual echo component.

* * * * *